Patented Jan. 8, 1929.

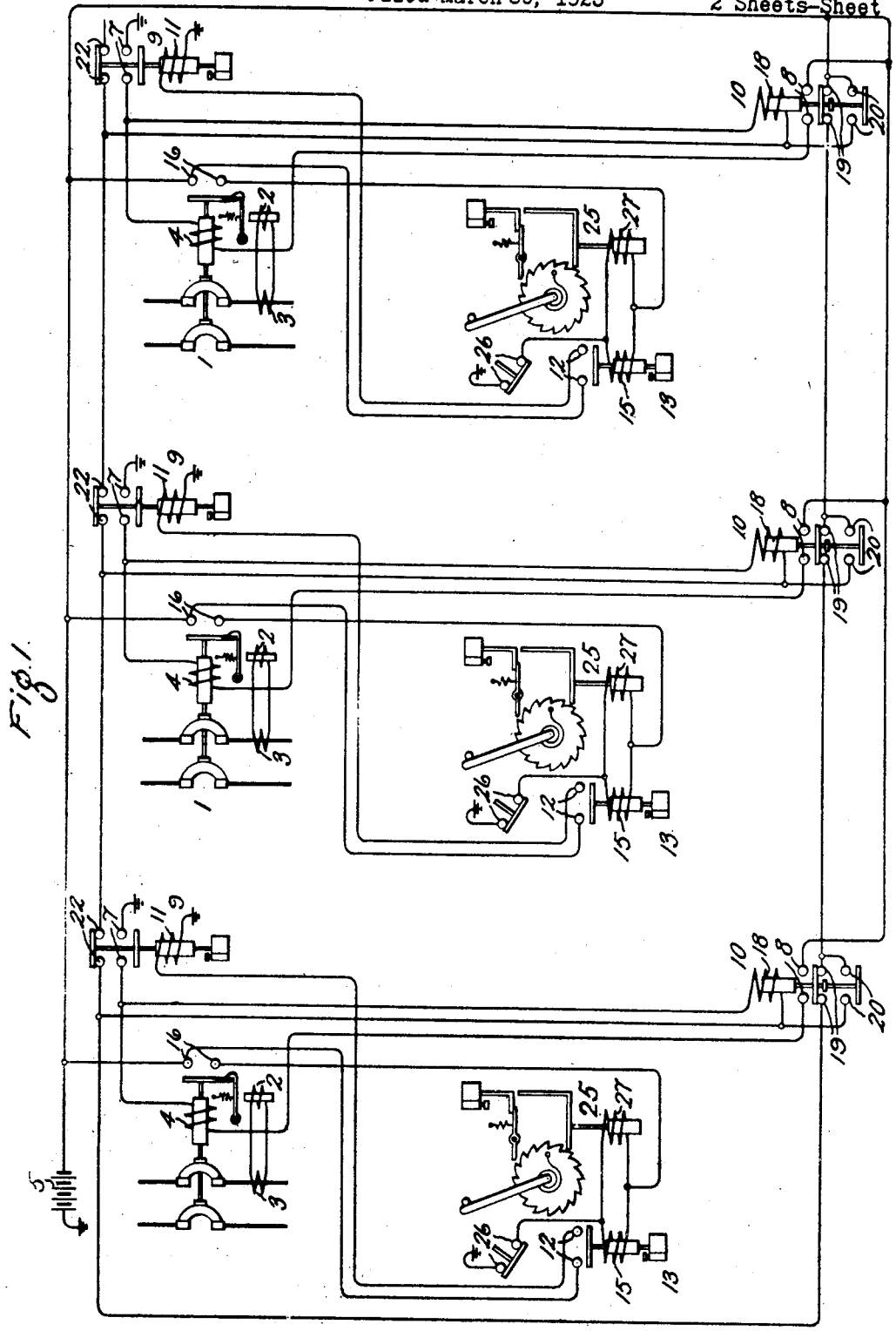

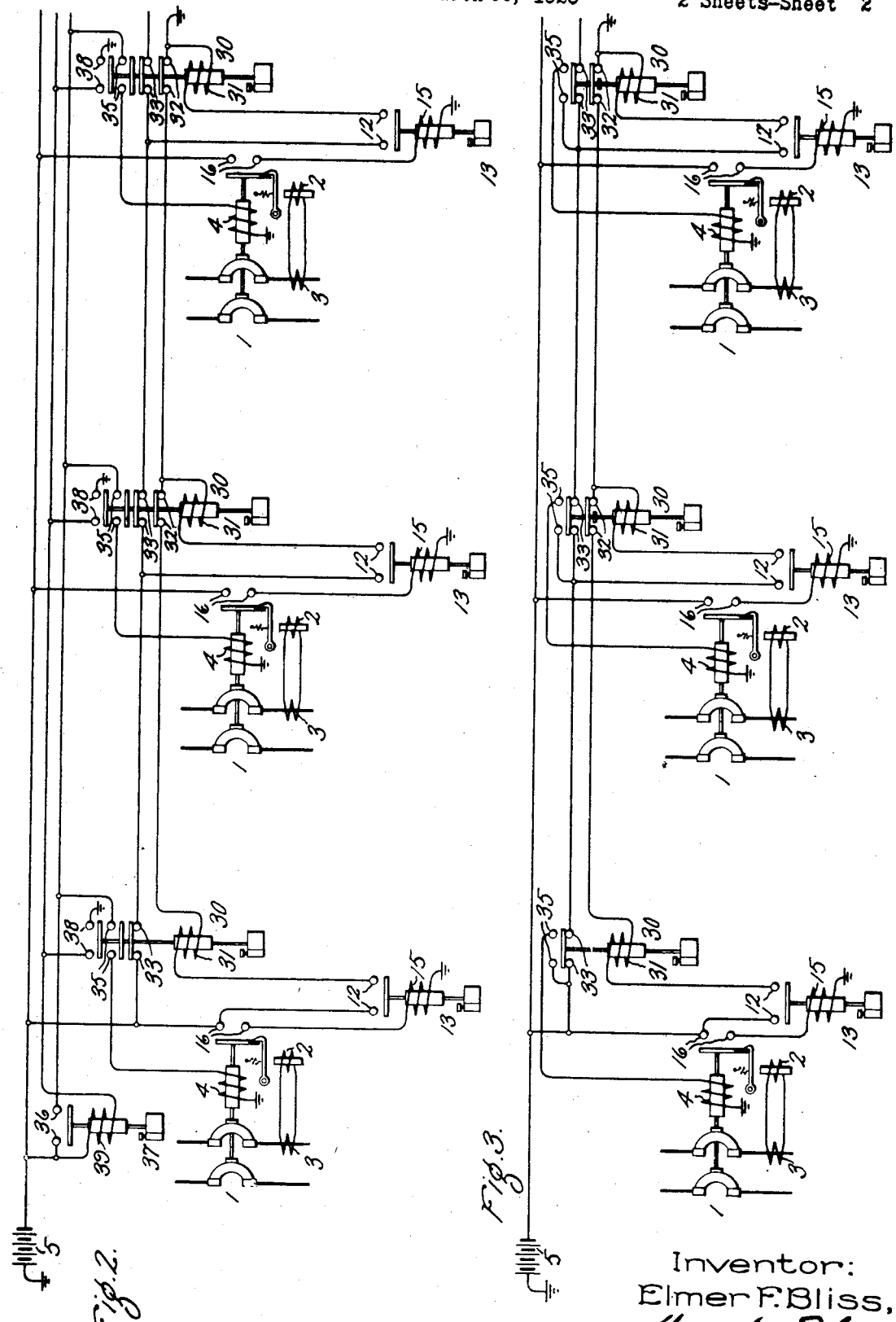

1,698,295

UNITED STATES PATENT OFFICE.

ELMER F. BLISS, OF ALPLAUS, NEW YORK, ASSIGNOR TO GENERAL ELECTRIC COMPANY, A CORPORATION OF NEW YORK.

CONTROL SYSTEM FOR ELECTRORESPONSIVE DEVICES.

Application filed March 30, 1923. Serial No. 628,884.

My invention relates to control systems for electroresponsive devices such as circuit breakers and particularly to such systems in which a plurality of circuit breakers are provided with electromagnetically operated closing means which are arranged to be supplied with current from a common source, such as a battery.

In order to reduce the size and cost of the source, it is desirable to control the operation of the circuit breakers so as to limit the number of circuit breakers that can be closed simultaneously.

One object of my invention is to provide an improved control system for a plurality of electroresponsive devices whereby only a predetermined number of said electroresponsive devices can be connected to a common source at any instant.

Another object of my invention is to provide an improved control system of the type referred to, whereby the closing means of only one circuit breaker can be supplied with current from the common source at any instant.

My invention will be better understood from the following description taken in connection with the accompanying drawing and its scope will be pointed out in the appended claims.

In the drawing, Fig. 1 shows a reclosing circuit breaker system embodying my invention and Figs. 2 and 3 show modifications of the embodiment shown in Fig. 1.

Referring to Fig. 1, a plurality of circuit breakers 1 which may be of any suitable type are shown, each breaker being arranged to control a separate circuit. As illustrated, each circuit breaker is of the well known latched-in type and is provided with a tripping coil 2 which is energized by a current transformer 3 connected in the circuit which is controlled thereby. Each tripping coil is so arranged that it operates to trip the latch that holds the circuit breaker in its closed position, when the current through the circuit exceeds a predetermined value. Any other well known means, however, may be used for controlling the opening of each circuit breaker.

Each circuit breaker is also provided with a closing coil 4 which, when energized, closes the circuit breaker. Each closing coil 4 is arranged to be supplied with current from any suitable source of current, shown as a battery 5 which is common to all of the closing coils.

It is evident that if no means were provided for limiting the number of closing coils 4 that could be connected to the battery 5 at any instant, it would be necessary to have a battery of sufficient capacity to supply all the closing coils at the same instant without the voltage dropping below the operating value of the closing coils. For large installations the size and cost of such a battery are so great that it is not economical to use such an arrangement unless the character of service is such as to require it.

In systems in which the character of service is such that an interruption of a short duration may be maintained without serious results, it is evident that if suitable means are provided so that only one circuit breaker can be closed at a time, it is only necessary to provide a battery having sufficient capacity to close one breaker.

In the system shown in Fig. 1, I arranged the circuit of the closing coils so that only one of them can be connected to the battery 5 at any instant, this arrangement being such that the circuit of each closing coil is closed only when all of the other closing coils are deenergized. The circuit of each closing coil 4 is controlled by two control relays 9 and 10 associated therewith. When both of the control relays 9 and 10 associated with any one of the circuit breakers are energized, the circuit of the closing coil 4 of that circuit breaker is completed across the battery 5 through contact 8 of the relay 10 and the contacts 7 of the relay 9. In order to insure that the closing operation of each circuit breaker is completed, each control relay 9 is preferably designed so that it does not open its contacts 7 until a predetermined time after the coil 11 is deenergized which occurs when the circuit breaker controlled thereby closes.

Each control relay 9 is arranged so that its operating coil 11 is energized when the circuit breaker, with which it is associated, opens. As shown, the opening of a circuit breaker closes its auxiliary contacts 16, thereby completing the circuit of a coil 15 of a time relay 13 associated therewith, which by closing its contacts 12 completes the circuit of the coil 11 of the control relay 9 associated therewith. Preferably each time relay 13 is designed in any suitable manner so that it does not close its contacts 12 until after the coil 15 has been energized a certain length of time, but does open its contacts 12 as soon as the coil 15 is deenergized.

The closing of the contacts 7 of each control relay 9 when it is energized, also completes the circuit of the coil 18 of its associated control relay 10 provided all of the other control relays 10 are deenergized. This result is obtained by having the energizing circuit of each control relay 10 include contacts of all of the relays 10. As shown, the energizing circuit of each coil 18 includes the contacts 19 of all of the relays 10 so that if any one of the control relays 9 is energized, the control relay 10 associated therewith is not energized if any other one of the control relays 10 is energized.

In order to prevent two or more of the control relays 10 being energized simultaneously by the simultaneous energization of two or more control relays 9, I arrange the circuits of the control relays 10 so that they operate in a predetermined sequence under such conditions. This is accomplished by having each control relay 9 when energized, open the circuits of all the control relays 10 which follow its associated control relay 10 in said sequence. As shown in the drawing the sequence in which the relays 10 operate under the above mentioned conditions is the same as the order in which they appear from left to right in the drawing, namely, the control relay 10 nearest the left edge of the drawing operates first, then the middle control relay 10 operates second and the other control relay 10 operates last. This result is accomplished by having the circuit of the middle control relay 10 include the contacts 22 of the control relay 9 nearest the left edge of the drawing and the circuit of the control relay 10 nearest the right edge of the drawing include the contacts 22 of the control relays 9 associated with the other two control relays 10, the contacts 22 being closed only when the respective relays are not energized. Therefore it is evident that if two or more control relays 9 are simultaneously energized, the one nearest the left edge of the drawing opens the energizing circuits of the control relays 10 associated with all the other control relays 9 which are energized so that only the control relay 10 associated with the control relay 9 nearest the left edge of the drawing is operative to effect the closing of a circuit breaker in a manner hereinafter described. As soon as the circuit breaker controlled by the two energized control relays 9 and 10 nearest the left edge of the drawing is closed, the control relay 10 associated with the next energized control relay 9 nearest the left edge of the drawing is energized and effects the closing of its circuit breaker. This operation continues in the predetermined sequence until all of the circuit breakers are closed.

In order to prevent the coil 18 of each control relay 10 being deenergized by the opening of its own contacts 19 which are connected in the energizing circuit of the relay, each control relay 10 is provided with contacts 20 which are closed when the relay is energized and which complete a locking circuit for its coil 18 independent of its contacts 19 and contacts 22 of any of the control relays 9. Preferably the relays 10 are so designed that they close their contacts 20 before they open their contacts 19, thereby insuring that the relay will remain energized. Therefore after the energizing circuit of a control relay 10 has been completed, the relay remains energized until the circuit breaker with which it is associated is closed. Furthermore, it is evident that when any one of the control relays 10 is energized, the energization of any one of the control relays 9 associated with one of the control relays 10 which precedes the energized control relay 10 in said predetermined sequence does not effect the energization of the control relay 10 associated therewith because the energizing circuit of the coil of this relay is open at the contacts 19 of the relay 10 which is energized.

In order to limit the number of times that a circuit breaker may be opened and closed when a permanent overload or short circuit is connected to the circuit controlled thereby, each circuit breaker has associated therewith a notching relay 25 of any suitable type, which is provided with the contacts 26 in the circuit of the coil 15 of the time relay 13 associated with the circuit breaker, the contacts 26 being arranged to be opened after the coil 27 has been successively energiezd a predetermined number of times. As shown each notching relay 25 has its operating coil 27 connected in parallel with the coil 15 of the time relay 13 associated therewith so that it is energized every time the circuit breaker opens and is of the well known type which opens its contacts 26 after its coil 27 has been energized a predetermined number of times with less than a predetermined time interval between successive energizations of the coil 27. Preferably the contacts 26, after being opened, have to be manually reset.

The operation of the embodiment of my invention shown in Fig. 1 is as follows:

When all of the circuit breakers 1 are closed and the load conditions are normal, the control devices are in the positions shown. Each circuit breaker is held in its closed position by the latch associated therewith. In case of an overload or short circuit on any one of the circuits, the tripping coil 2 of the circuit breaker in this particular circuit is energized and opens the circuit breaker in said circuit. When the circuit breaker opens, its auxiliary contacts 16 complete the circuit of the coils 15 and 27 of the time relay 13 and the notching relay 25 respectively. This circuit is as follows: from the ungrounded side of the battery 5 through the contacts 16 on the open circuit breaker, coils 15 and 27 of the relays 13 and 25 respectively, contacts 26 of the notching relay 25 to ground. The notching relay 25 notches up one notch but does not open its contacts 26. After a predetermined time, determined by the setting of the time relay 13 of the open breaker, the contacts 12 of this relay are closed so that the circuit of the coil 11 of the control relay 9 associated with the open breaker is completed. This circuit is as follows: from the ungrounded side of the battery 5, through the contacts 12 of the time relay 13, the coil 11 of the control relay 9 to ground. The relay 9 by opening its contacts 22, opens the circuit of all of the coils 18 between it and the right edge of the drawing so that none of these coils is energized by the subsequent energization of its respective associated control relays. By closing its contacts 7 the relay 9 connects the coil 18 of the control relay 10 associated therewith across the battery 5 if all the other control relays 10 are in their normal positions. This circuit is as follows: from the ungrounded side of the battery 5, through the contacts 19 of all of the control relays 10, the contacts 22 of all the control relays 9 to the left of the control relay 9 associated with the open circuit breaker, the coil 18 of the control relay 10 associated with the open circuit breaker, the contacts 7 of the control relay 9 associated with the open circuit breaker, to ground. The control relay 10 by closing its contacts 8 completes the circuit of the closing coil 4 of the circuit breaker controlled thereby so that it is closed. This circuit is as follows: from the ungrounded side of the battery 5, through the contacts 8 of the control relay 10, the coil 4 of the circuit breaker, the contacts 7 of the control relay 9, to ground. The control relay 10, by closing its contacts 20, completes the locking circuit for itself which is independent of the contacts 19 of the relay and the contacts 22 of all of the control relays 9, and by opening its contacts 19, opens the energizing circuits of all of the other coils 18, so that none of them can be energized. Consequently only one closing coil 4 can be connected to the battery 5 at any instant.

The closing of a circuit breaker opens its contacts 16 so that the coil 15 of the time relay 13 and the coil 27 of the notching relay 25 associated therewith are deenergized. The opening of the contacts 12 of the time relay 13 deenergizes the coil 11 of the control relay 9. After a predetermined time, the control relay 9 opens its contacts 7 so that the control relay 10 associated therewith is deenergized and is restored to its normal position.

If the short circuit or overload is still connected to the circuit when the circuit breaker in the circuit closes, the circuit breaker opens immediately and the above operation of the reclosing equipment is repeated.

If any one of the circuit breakers is opened and closed a predetermined number of times with less than a predetermined time between each successive closing and opening, the notching relay 25 opens its contacts 26 so that the time relay 13 is not energized when the associated circuit breaker is open. Since the contacts 26 have to be manually reset, the reclosing equipment is rendered inoperative until the contacts 26 are closed. If the circuit breaker remains closed for a certain length of time before the notching relay opens its contacts 26, the notching relay automatically resets to its normal position in a manner well known in the art.

In the modification shown in Fig. 2, the control relays 9 and 10 associated with each circuit breaker in Fig. 1 are replaced by a single relay 30. The notching relays 25 have been omitted in order to simplify the drawing. The circuit of the coil 31 of each relay 30 includes the contacts 12 of the time relay 13 of the circuit breaker controlled by the relay 30 and contacts 32 of all the other relays 30 between the particular relay 30 in question and the right edge of the drawing. The circuit of each coil also includes the contacts 33 of all the other relays 30 between the particular relay 30 in question and the left edge of the drawing. Therefore, since the contacts 32 and 33 of each relay 30 are closed when the relay is not energized, any one of the relays 30 can be energized only when all of the other relays 30 are not energized.

Each relay 30 is also provided with contacts 35, which are connected in the circuit of the closing coil 4 of the circuit breaker controlled thereby and which are closed when the relay is energized. Preferably the relays 30 are designed in any well known manner so that they will not open their contacts 35 until a certain time after the coils 31 thereof are deenergized, thereby insuring the closing of the circuit breakers controlled thereby. The circuit of each closing coil 4 also includes the contacts 36 of a time relay 37 which is common to all of the closing coils 4. This relay is provided in order to insure that one and only one of closing coils 4 is energized when the contacts 12 of more than one time relay are closed at the same instant. If two or more of the contacts 12 were closed at the same instant, the relays 30 which are controlled thereby might be so designed that they would operate in synchronism so that each would open and close the circuit of the other at substantially the same instant. This vibrating action would continue until finally one relay operated far enough ahead of the other relays so that the opening of its contacts 32 or 33 would prevent the other relays from being energized. During this vibrating operation of the relays, two or more of the contacts 35 might be closed at the same instant so that if no other contacts were provided in the circuits of the closing coils 4, two or more closing coils would be connected across the battery for an instant. By providing each relay with the contacts 38 which when closed complete the circuit of the coil 39 of the time relay 37, and designing the relay 37 so that it does not operate to close its contacts 36 until after the coil 39 has been energized a certain length of time which is sufficient for one of the relays 30 to lock out the other relays in case two or more are simultaneously energized, only one closing coil 4 at a time is connected to the battery 5.

The operation of the modification shown in Fig. 2 is similar to the arrangement shown in Fig. 1 so that only a brief description thereof is deemed necessary. The opening of any one of the circuit breakers completes the circuit of the time relay 13 associated therewith which in turn energizes the control relay 30 associated therewith if all of the other relays 30 are deenergized since the circuit of each relay 30 includes the contacts 33 of the other relays 30 to the left thereof and the contacts 32 of the other relays 30 to the right thereof. By opening its contacts 32 and 33 when it is energized, each relay 30 prevents any one of the other relays 30 from being energized while it is energized. The closing of the contacts 38 of any one of the relays 30 completes the circuit of the coil 39 of the time relay 37 which after a predetermined time closes its contacts 36 and completes the circuit of the closing coil 4 of the circuit breaker associated with the control relay 30 which is energized. After the circuit breaker is closed the relays 13 and 30 associated therewith and the time relay 37 are deenergized and return to their normal positions.

Fig. 3 shows a modification of the arrangement shown in Fig. 2 whereby the relay 37 and the contacts 38 on the relays 30 shown in Fig. 2 may be omitted. In this modification, the contacts 33 of each relay are arranged to be opened in any suitable manner before the contacts 32 are opened. The circuit of each closing coil 4 also includes the contacts 33 of all of the control relays 30 associated with the circuit breakers to the left thereof. Therefore if two or more of the relays 30 are simultaneously energized so that two or more of the contacts 35 are closed at the same instant, current is only supplied to the closing coil 4 which is controlled by energized relay 30 which is nearest the left edge of the drawing, because the opening of the contacts 33 of this relay opens the circuits of all of the circuit breakers between it and the right edge of the drawing. Therefore if a vibratory operation of two or more relays 30 occurs due to two or more contacts 12 being closed at the same instant, there is no danger of two or more closing coils 4 being connected to the battery 5. When, finally, one of the relays 30 locks out the other relays 30 the closing coil 4 controlled by the relay is energized for a sufficient length of time to close the circuit breaker.

It is believed that the operation of the modification shown in Fig. 3 will be obvious from the above description, and the description of the operation of Fig. 2, so that a description of the operation of Fig. 3 is deemed unnecessary.

While I have shown and described several modifications of my invention, I do not desire to be limited to the exact arrangements shown and described, but seek to cover in the appended claims all those modifications that fall within the true spirit and scope of my invention.

What I claim as new and desire to secure by Letters Patent of the United States, is:

1. In combination, a plurality of circuit breakers, closing means for each circuit breaker, means associated with each circuit breaker whereby the closing means therefor may be operated, and means connected and arranged whereby the operation of any one of said second mentioned means effects the operation of the closing means for the circuit breaker associated therewith if none of the other closing means is operating and prevents the operation of the closing means for the other circuit breakers while the closing means for the circuit breaker associated therewith is operating.

2. In combination, a plurality of circuit breakers, electroresponsive closing means for each circuit breaker, a common source of current for said electroresponsive closing means, a plurality of relays, each relay being associated with one of said circuit breakers and controlling the connection of the closing means therefor to said source, a circuit for each relay, and a plurality of contacts in each relay circuit respectively controlled by the other relays whereby only one of said relays may be operated at a time to effect the connection of an electroresponsive closing means to said source.

3. In combination, a plurality of circuit breakers, electroresponsive closing means for each circuit breaker, a common source of current for said electroresponsive means, a plurality of relays, each relay being associated with one of said circuit breakers and controlling the connection of the closing means therefor to said source, a circuit for each relay, and a plurality of contacts in each relay circuit respectively controlled by the other relays whereby the circuit of each relay may be completed only when all of the other relays are deenergized.

4. In combination, a plurality of circuit breakers, electroresponsive closing means for each circuit breaker, a common source of current for said electroresponsive closing means, a plurality of relays, each relay being associated with one of said circuit breakers and controlling the connection of the closing means therefor to said source, a circuit for each relay, means whereby each relay circuit may be completed to effect the connection of the closing means controlled thereby, and a plurality of contacts in each relay circuit respectively controlled by the other relays whereby none of the circuits of the other relays may be completed when any one of the relays is energized.

5. In combination, a plurality of circuit breakers, a closing coil for each circuit breaker, a source of current, a circuit for each closing coil including said source, contacts in each closing coil circuit, a relay associated with each circuit breaker and arranged when energized to effect the closing of the contacts in the closing coil circuit of the circuit breaker associated therewith, a circuit for each relay, and a plurality of contacts in each relay circuit respectively controlled by the other of said relays whereby only one relay may be energized at a time.

6. In combination, a plurality of circuit breakers, a closing coil for each circuit breaker, a source of current, a circuit for each closing coil including said source, contacts in each closing coil circuit, a relay associated with each circuit breaker and arranged when energized to effect the closing of the contacts in closing coil circuit of the circuit breaker associated therewith, a circuit for each relay, and a plurality of contacts in each relay circuit respectively controlled by the other relays whereby the circuit of each relay may be completed only when all of the other relays are deenergized.

7. In combination, a plurality of circuit breakers, a closing coil for each circuit breaker, a circuit for each closing coil, contacts in each closing coil circuit, a relay associated with each circuit breaker and arranged when energized to effect the closing of the contacts in the closing coil circuit of the circuit breaker associated therewith, a circuit for each relay, contacts in each relay circuit, a time relay associated with each circuit breaker connected and arranged to be operated in response to the opening thereof to effect the closing of the contacts in the circuit of the relay associated therewith after the breaker has been open a certain length of time, and other contacts in the circuit of each relay controlled by the other of said relays whereby only one relay may be energized at a time.

8. In combination, a plurality of circuit breakers, a closing coil for each circuit breaker, a circuit for each closing coil, contacts in each closing coil circuit, a relay associated with each circuit breaker and arranged when energized to effect the closing of the contacts in the closing coil circuit of the circuit breaker associated therewith, a circuit for each relay, contacts in each relay circuit, a time relay associated with each circuit breaker connected and arranged to be operated in response to the opening thereof to effect the closing of the contacts in the circuit of the relay associated therewith after the breaker has been open a certain length of time, and other contacts in the circuit of each relay controlled by the other relays whereby the circuit of each relay may be completed only when all of the other relays are deenergized.

9. In combination, a plurality of electroresponsive devices, a source of current, a control relay associated with each electroresponsive device and arranged to effect the connection of its associated electroresponsive device to said source, a circuit for each control relay, and a plurality of contacts in each relay circuit respectively controlled by the position of the other relays so that no other relay can operate to effect the connection of its associated electroresponsive device to said source when any one of said relays is in a position to effect the connection of its associated electroresponsive device to said source.

10. In combination, a plurality of electroresponsive devices, a source of current, a control relay associated with each electroresponsive device and arranged when energized to effect the connection of its associated electroresponsive device to said source, and an energizing circuit for each relay arranged to be closed only when all of the other of said relays are deenergized and its associated electroresponsive device is in a predetermined position.

11. In combination, a plurality of electroresponsive devices, a source of current, a control relay associated with each electroresponsive device and arranged when energized to effect the connection of its associated electroresponsive device to said source, a circuit for each control relay, contacts in the circuit of each control relay arranged to be closed when the electroresponsive device with which the control relay is associated is in a predetermined condition, and other contacts in the circuit of each control relay arranged to be closed when certain other control relays are deenergized.

12. In combination, a plurality of circuit breakers, a closing coil for each circuit breaker, a source of current, a control relay associated with each circuit breaker and arranged when energized to effect the connection of the closing coil of its associated circuit breaker to said source, a circuit for each control relay, contacts in the circuit of each control relay arranged to be closed in response to the opening of the circuit breaker with which the control relay is associated, and other contacts in the circuit of each control relay arranged to be closed when certain other of said control relays are deenergized.

In witness whereof, I have hereunto set my hand this 22nd day of March, 1923.

ELMER F. BLISS.

CERTIFICATE OF CORRECTION.

Patent No. 1,698,295.        Granted January 8, 1929, to

ELMER F. BLISS.

It is hereby certified that error appears in the printed specification of the above numbered patent requiring correction as follows: Page 3, line 31, after the word "relays" and before the period insert the numeral "9"; page 5, line 17, claim 4, after the word "thereby" insert the words "to said source"; and that the said Letters Patent should be read with these corrections therein that the same may conform to the record of the case in the Patent Office.

Signed and sealed this 12th day of February, A. D. 1929.

M. J. Moore,
Acting Commissioner of Patents.

(Seal)